US011178896B2

(12) United States Patent
Stine

(10) Patent No.: US 11,178,896 B2
(45) Date of Patent: Nov. 23, 2021

(54) FRUIT AND VEGETABLE SKIN PATTERNED OXIDIZER

(71) Applicant: Peter Stine, Baltimore, MD (US)

(72) Inventor: Peter Stine, Baltimore, MD (US)

(*) Notice: Subject to any disclaimer, the term of this patent is extended or adjusted under 35 U.S.C. 154(b) by 366 days.

(21) Appl. No.: 16/219,262

(22) Filed: Dec. 13, 2018

(65) Prior Publication Data

US 2019/0320704 A1 Oct. 24, 2019

Related U.S. Application Data

(60) Provisional application No. 62/659,960, filed on Apr. 19, 2018.

(51) Int. Cl.
*A23N 15/06* (2006.01)

(52) U.S. Cl.
CPC .................. *A23N 15/06* (2013.01)

(58) Field of Classification Search
CPC .. A23N 15/06; B41D 7/02; B41F 3/80; B41F 3/54; B41F 3/56; B41F 13/18; B41L 35/10
USPC ............ 28/109; 493/324, 325, 953; D7/672, D7/675, 381
See application file for complete search history.

(56) References Cited

U.S. PATENT DOCUMENTS

| | | | | |
|---|---|---|---|---|
| 701,662 A * | 6/1902 | Zaiser | .................. | B28B 7/0017 249/187.1 |
| 2,433,622 A * | 12/1947 | Novak | .................. | B65D 65/38 426/90 |
| 2,622,513 A * | 12/1952 | Rinehart | .................. | B44B 7/00 101/32 |
| 3,770,093 A * | 11/1973 | De Hart | .................. | B41C 1/141 400/135 |
| 4,216,690 A * | 8/1980 | Bullock | .............. | B26D 7/0625 83/114 |
| 4,260,102 A * | 4/1981 | Thoma | ...................... | B41J 3/24 101/19 |
| D274,592 S * | 7/1984 | Bever | ............................ | 426/87 |
| 4,818,207 A * | 4/1989 | Heron | .................. | A21C 11/106 249/103 |
| D337,031 S * | 7/1993 | Schroth, Jr. | .................... | D7/675 |
| 5,660,747 A * | 8/1997 | Drouillard | ............ | A01J 27/005 219/121.69 |
| 6,267,036 B1 * | 7/2001 | Lani | ...................... | A23N 15/00 30/315 |
| D560,137 S * | 1/2008 | Rettert | .......................... | D11/117 |
| 9,207,527 B1 * | 12/2015 | Shooshan | .................. | G09F 7/04 |
| D885,146 S * | 5/2020 | Lopez | ............................ | D7/672 |
| 2009/0188090 A1 * | 7/2009 | Munstermann | ......... | D04H 18/04 28/104 |

(Continued)

FOREIGN PATENT DOCUMENTS

KR 200435959 Y1 * 3/2007

*Primary Examiner* — John J Norton

(74) *Attorney, Agent, or Firm* — U. Maryland Balt. Carey School of Law MIPLRC/IPEC

(57) ABSTRACT

A device, which can be used to convey a message on the skin of fruits and/or vegetables, the device having at least one prong capable of piercing the skin of a fruit and/or vegetable and connected to a rigid base that limits the depth the prong pierces the skin of the fruit and/or vegetable. The prongs may be configured in the mirror inverse shape of a character, symbol, picture and/or pattern. The device may be used to convey messages or designs on the skin of bananas.

6 Claims, 3 Drawing Sheets

(56) References Cited

U.S. PATENT DOCUMENTS

| | | | |
|---|---|---|---|
| 2011/0082020 A1* | 4/2011 | Tsai | B31F 1/07 |
| | | | 493/324 |
| 2011/0091620 A1* | 4/2011 | Han | A23B 7/02 |
| | | | 426/456 |
| 2011/0268371 A1* | 11/2011 | Kristal | B29C 59/02 |
| | | | 383/5 |
| 2017/0055767 A1* | 3/2017 | Brown | A47J 37/041 |
| 2018/0014469 A1* | 1/2018 | Buelow | F21V 9/32 |
| 2019/0355283 A1* | 11/2019 | Ko | B44C 1/24 |

* cited by examiner

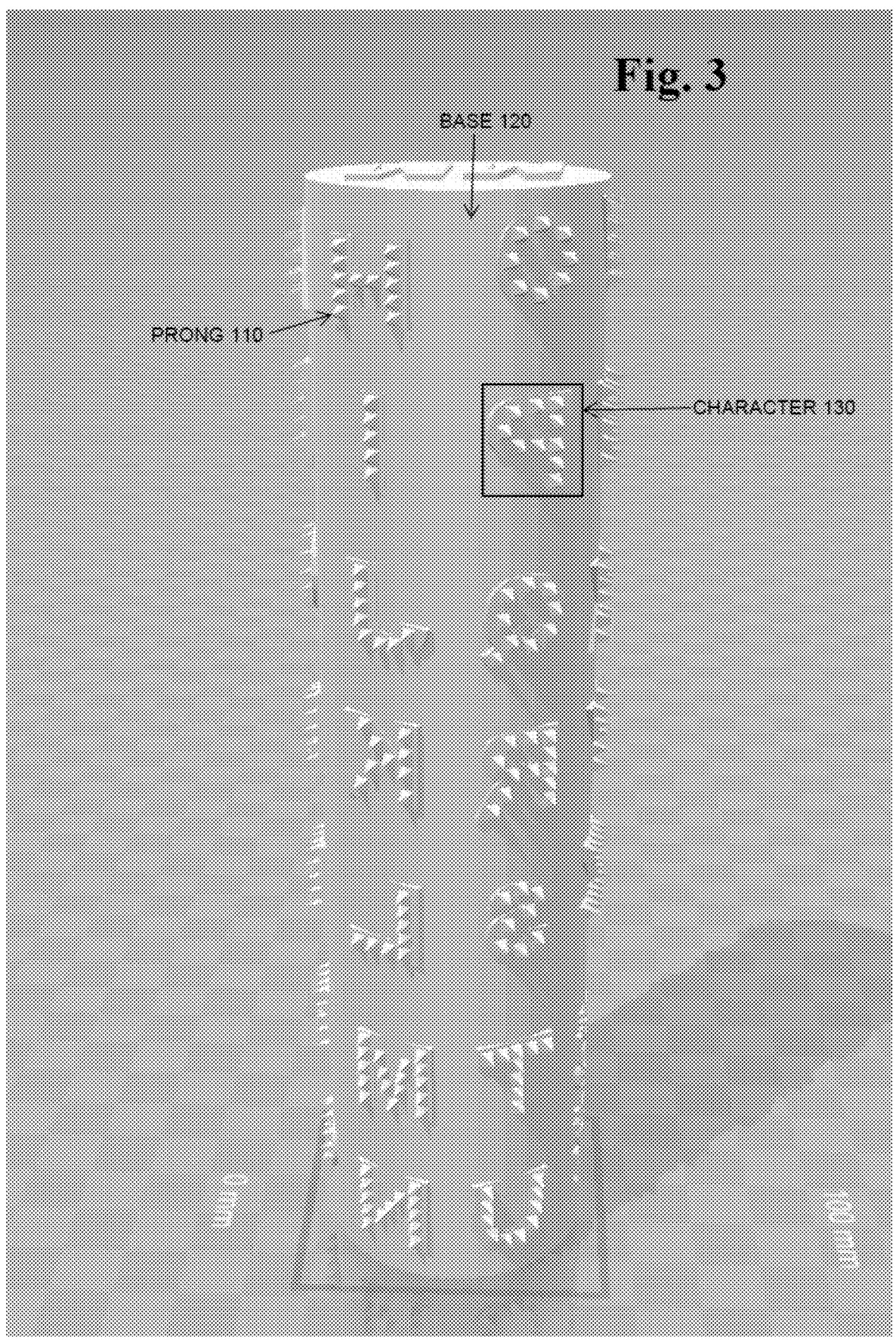

FRUIT AND VEGETABLE SKIN PATTERNED OXIDIZER

This application claims the benefit of U.S. Provisional Application No. 62/659,960 filed Apr. 19, 2018, which is incorporated by reference herein in its entirety.

BACKGROUND

Piercing the skin of some fruits and/or vegetables, specifically bananas, exposes polyphenol oxidase or other chemicals to the air. The oxygen in the air reacts with these chemicals and causes discoloration. This process is known as oxidation. Oxidation presents a visible color change on the skin of the fruit or vegetable in the vicinity of the piercing.

BRIEF DESCRIPTION OF THE DRAWINGS

FIG. 3 is a 3D printing file depicting a side view of an embodiment of the invention.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

In an embodiment, the oxidation device comprises at least one pointed or sharp prong that is capable of piercing the outer skin of a fruit and/or vegetable. The prong is attached to a flat-sided, or cylindrical shaped base that allows the prong to pierce the outer skin of a fruit and/or vegetable to a uniform depth. The prong or prongs may protrude in a shape or pattern that is the mirror inverse image of a desired character, symbol, picture and/or pattern to be displayed on the fruit or vegetable.

In preferred embodiments, the prongs of the oxidation device are protruding from the base of the device at a height that will pierce the skin enough to promote a controlled oxidation pattern while causing minimal or no spoilage of the fruit and/or vegetable beneath the skin.

In a preferred embodiment, multiple sets of prongs protrude from the base. Each set of prongs is arranged in the mirror inverse of characters, symbols, pictures and/or patterns. These sets of prongs are distanced from each other enough to allow a user of the device to imprint fruits and/or vegetables with one of the sets of prongs at a time. The device may allow imprinting along the fruit or vegetable's curved and straight surfaces. By imprinting a series of letters, for example, the device may be used to create a message on the fruit or vegetable. The device may accommodate varying fruit and/or vegetable sizes and shapes and does not require special fitting.

Figure 1:
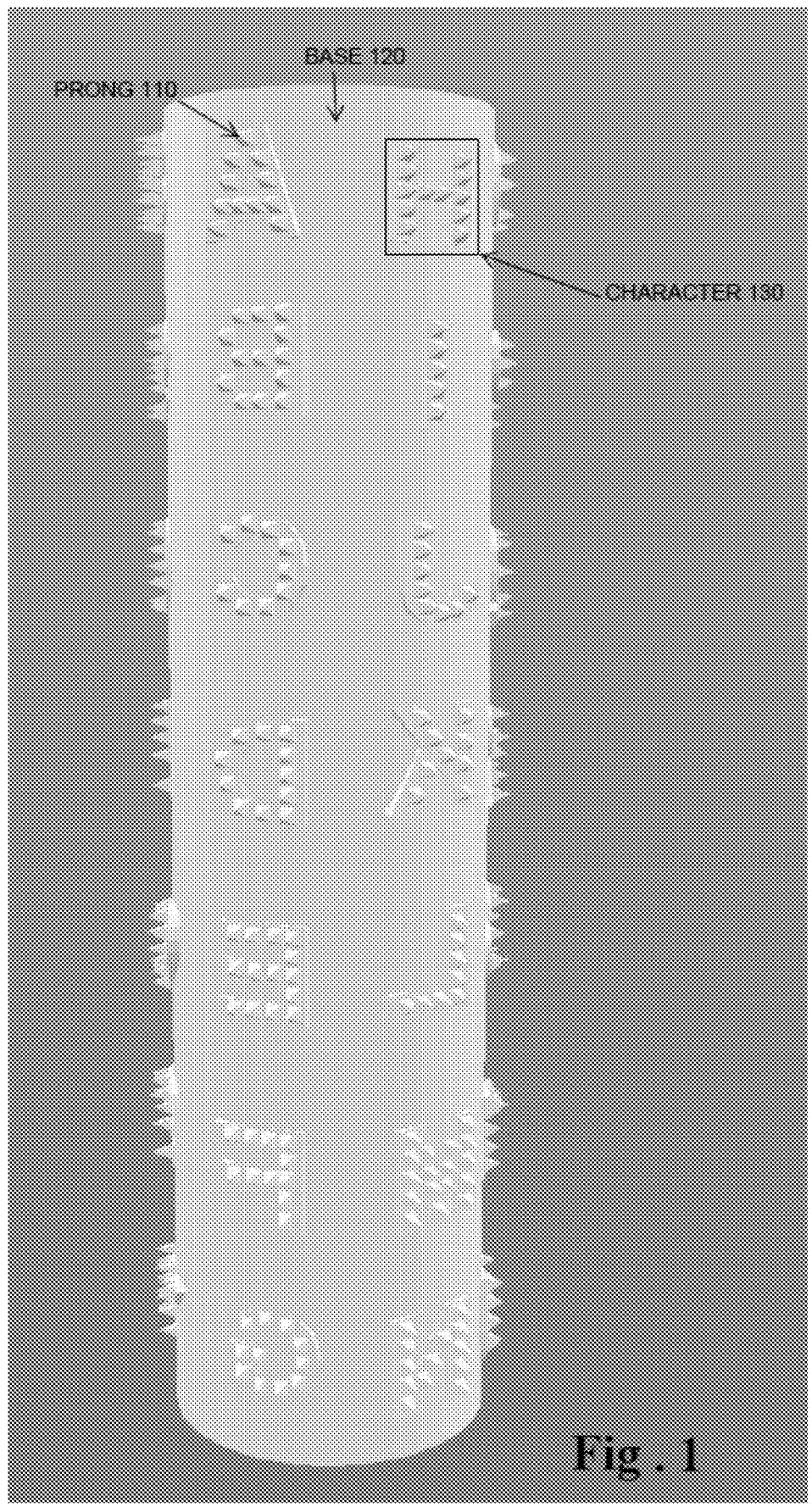
FIG. 1 is a 3D printing file depicting a side view of an embodiment of the invention.
Figure 2:
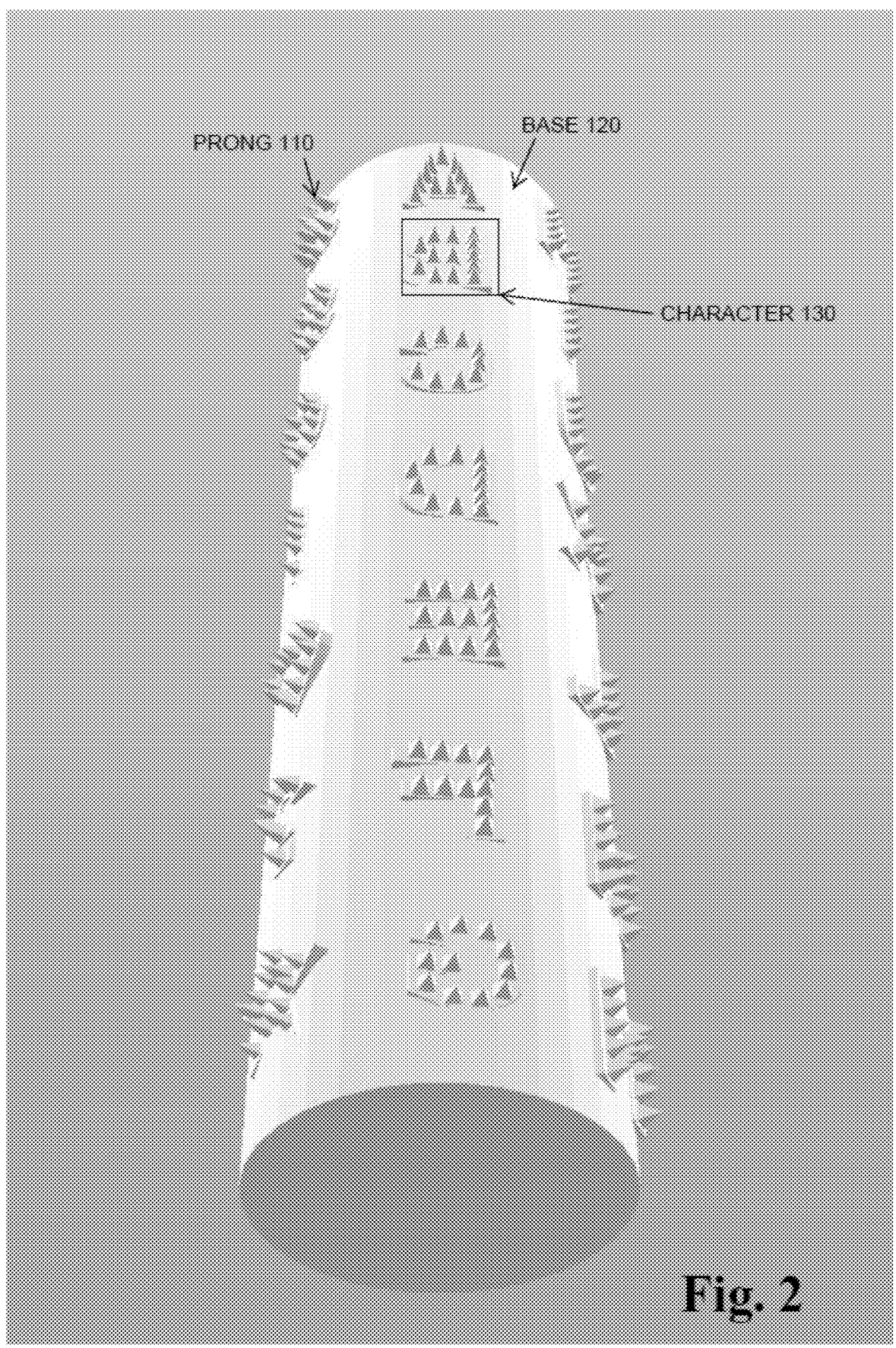
FIG. 2 is a 3D printing file depicting an angled view of an embodiment of the invention illustrating the prongs' orientation.

FIGS. 1, 2, and 3 illustrate views of an embodiment of the invention. The invention has a prong 110 that protrudes from a base 120 in a manner that can pierce the skin of a fruit and/or vegetable creating an oxidation hole. Multiple prongs are arranged in the mirror inverse of a character 130, symbol, picture or pattern. In this illustration, the prongs are pyramid shaped and protrude from the base, which is cylindrically shaped.

In an alternative embodiment, the prongs could be in a different shape, and could be spikes or pins. The base may be flat. The height of the prongs may be between one millimeter and five millimeters. The rigid base may be made of plastic, metal or a ceramic material. The device may be 3D printed, molded or cast in place. Alternatively, other materials and manufacturing methods may be used.

The terminology used in the description of the invention herein is for the purpose of describing particular embodiments only and is not intended to be limiting of the invention. As used in the description of the invention and the claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising" when used in this specification, specify the presence of state features, integers, steps, operations, elements, and/or components, but do not preclude the presence of stated features, integers, steps, operations, elements, components, and/or groups thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A patterned oxidizing device comprising:
   a plurality of different alphanumeric characters each formed by a respective plurality of prongs, wherein said prongs protrude from a rigid base and are configured to pierce the skin of a fruit or vegetable to allow localized oxidation of the fruit or vegetable at the location of the piercing;
   wherein said base is adapted for uniformly limiting the depth to which said plurality of prongs pierces the skin of the fruit or vegetable; and
   wherein said prongs of each character are arranged on said base in a mirror inverse image of the character.

2. The patterned oxidizing device of claim 1, wherein said base is cylindrical.

3. The pattern oxidizing device of claim 1, wherein said prongs each protrude from said base at a height range between one millimeter and five millimeters.

4. The patterned oxidizing device of claim 1, wherein said prongs and said base are made out of plastic.

5. The patterned oxidizing device of claim 1, wherein said prongs and said base are made out of metal.

6. The patterned oxidizing device of claim 1, wherein said prongs and said base are made out of ceramic material.

* * * * *